May 10, 1960
H. GAFFIN
2,936,153
BUTTERFLY VALVE SEATING ARRANGEMENT
Filed Aug. 17, 1955
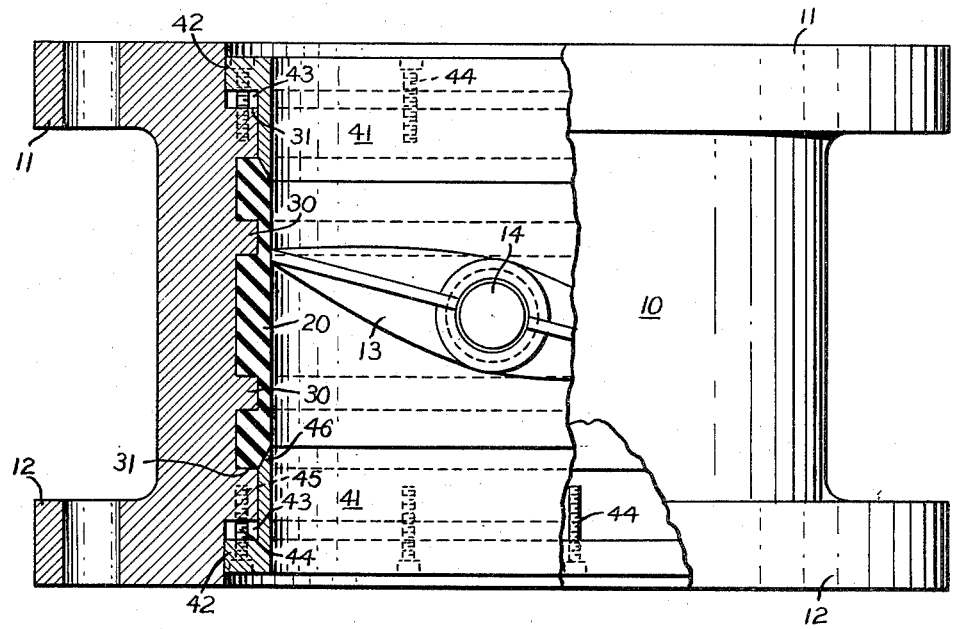
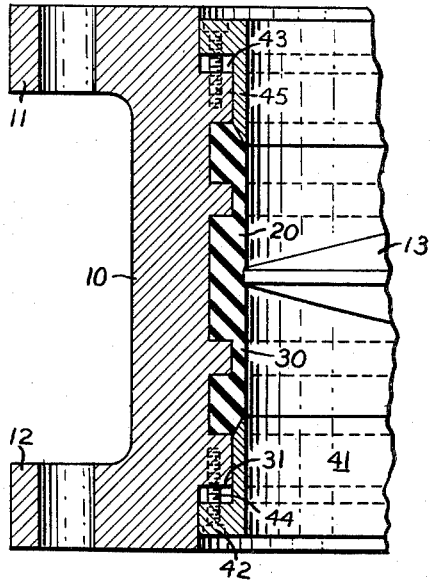
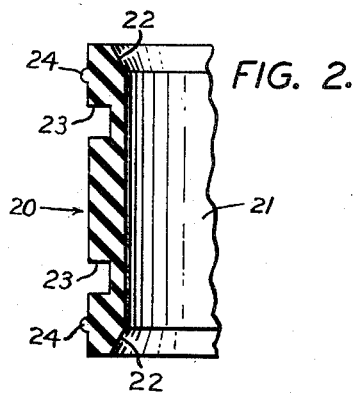

United States Patent Office 2,936,153
Patented May 10, 1960

2,936,153

BUTTERFLY VALVE SEATING ARRANGEMENT

Harry Gaffin, East Orange, N.J., assignor to The A. P. Smith Manufacturing Company, East Orange, N.J., a corporation of New Jersey Application August 17, 1955, Serial No. 528,930

3 Claims. (Cl. 251—306)

This invention relates to butterfly valves, and more particularly to valve seat constructions therefor.

The usual butterfly valve contains a valve disc of circular or elliptical shape and is rotatably carried in a valve housing or casing and seating against an elliptical or circular valve seat which may be formed integral with the casing or as a separate part, and which is generally surfaced with a resilient material, such as rubber, or any of various synthetics, depending upon service requirements. The resilient liner or facing of the valve seat is generally made separable from its supporting structure and requires attaching means which are generally formed as a number of segments, which together form a ring, and which are fastened in place for holding down the resilient liner element by means of radial screws or bolts. The installation and removal of these elements is inconvenient, they are relatively expensive and may disturb the smoothness of the inner surface, thus increasing turbulence and resistance to fluid flow.

The general object of the invention is to provide an improved valve seat and lining arrangement therefor, together with clamping means for holding it in place, which permit simple and rapid assembly and removal.

Valve seat arrangements embodying the invention in a preferred form will now be described with reference to the accompanying drawings, and the features forming the invention will then be pointed out in the appended claims.

In the drawings:

Fig. 1 is a view partly in elevation and partly in simple axial section of a butterfly valve embodying the invention in a preferred form;

Fig. 2 is a fragmentary detail showing the resilient valve seating element in uncompressed condition; and Fig. 3 is a fragmentary view similar to Fig. 1, showing a modified form of valve seat in which the seat is dimensioned to permit the valve to seat at right angles to the flow axis.

Referring to Fig. 1, the valve comprising a casing or pipe section 10 having flanges 11, 12 for joining it to pipe sections or flanges of any fluid flow equipment with which the valve may be used and within which is rotatably carried in the usual way, a valve disc 13, having trunnions 14 and rotatable counterclockwise to the closed position in the figure and clockwise to a position in parallelism with the casing axis for opening the valve. The disc seats against a rubber or other resilient liner element 20, which is formed as shown in Fig. 2 with a generally cylindrical inner surface 21, terminating in bevels 22 and with outer circumferential grooves 23 and beads 24. The grooves of the element 20 receive the circumferential inner ribs 30 of the casing, and the element 20 fits between shoulders 31 at its ends. The casing thus has an inner surface formed with three encircling grooves between ribs 30 and shoulders 31, which receive the projecting parts from the liner 20. The beads 24 which are positioned about where the bevels 22 commence are pressed flat when the liner is clamped, as hereinafter described.

The clamping arrangements at each end of the liner may be identical and are shown as being identical, and comprise for each end, a ring 41 formed with flange 42 which is received within an enlargement 43 of the central bore of the casing 10. Bolts 44 engaging in threaded bores 45 in the casing 10 serve to clamp the ring 41 in place. The ring 41 overlaps element 20 slightly, as shown, and has a beveled end 46 engaging bevel 22 of element 20. The space from a rib 30 to adjacent shoulder 31 is sufficiently short in relation to thickness of the liner 20 so that tightening up on the screws 44 clamps the edge of the liner 20 firmly in place so that an axial stress exerted on it is taken by a rib 30, which effectively prevents any movement of the liner. The screws 44 will ordinarily be distributed at equal intervals around the casing, and the number of screws used may be varied to suit particular conditions. Ordinarily six screws for each ring 41 will be adequate, and it will be apparent that assembly and disassembly of parts is very much simplified by comparison with the usual constructions.

The liner element 20 may be conveniently formed by a molding process and installed and replaced as a unit very rapidly and without any difficulty whatsoever.

The valve disc may seat in a position at right angles to the axis without modifying the action in any material way, and in this case the edge of the disc will preferably fall midway between the ribs 30, compressing the liner material slightly, as indicated in an exaggerated way in Fig. 3.

What is claimed is:

1. In a butterfly valve having a casing and a valve disc rotatable therein, the combination with the casing of an annular resilient valve disc seating element lining the casing inner surface, the casing and seating element having interlocking circumferential ribs and grooves and the seating element having a beveled inner edge, a correspondingly beveled axially movable clamping element overlapping the said beveled edge of the resilient valve seating element, and screw means acting between the casing and clamping element for moving the clamping element axially to engage and hold the said resilient valve seating element within the casing.

2. In a butterfly valve having a casing and a valve disc rotatable therein, the combination with the casing of an annular resilient valve disc seating element lining the casing inner surface, the casing having a recess receiving the said seating element and inwardly facing circumferentially extending ribs spaced from each other and from the edges of the said recess, the seating element having grooves cooperating with the said ribs, fitting in the said recess and having beveled inner edges, the said edges being substantially flush with the recess edges and the seating element generally extending radially inward beyond the said recess edges, correspondingly beveled axially movable clamping elements overlapping the said recess edges and the beveled edges of the resilient valve seating element, the said clamping elements and seating element having substantially flush radially inner surfaces, and screw means acting between the casing and clamping elements for moving the clamping elements axially to engage and hold the said resilient valve seating element within the casing.

3. In a butterfly valve having a casing and a valve disc rotatable therein, the combination with the casing of an annular resilient valve disc seating element lining the casing inner surface, the casing having a recess receiving the said seating element and inwardly facing circumferentially extending ribs spaced from each other and from the edges of the said recess, the seating element having grooves cooperating with the said ribs, fitting in the said recess and having beveled inner edges, correspondingly beveled axially movable clamping elements overlapping the said beveled edges of the resilient valve seating element, and screw means acting between the casing and clamping elements for moving the clamping elements axially to engage and hold the said resilient valve seating element within the casing, the seating element adjacent its beveled edges having excess thickness beyond the thickness needed to maintain its inner surface adjacent the bevels flush with its inner surface generally, whereby the seating element is compressed where clamped while having its exposed inner surface flush with the inner surfaces of the clamping elements.

References Cited in the file of this patent

UNITED STATES PATENTS

| | | |
|---|---|---|
| 474,322 | Harrington | May 3, 1892 |
| 2,240,711 | Miller | May 6, 1941 |
| 2,302,930 | Anderson | Nov. 24, 1942 |
| 2,446,620 | Swallow | Aug. 10, 1948 |
| 2,815,253 | Spriggs | Dec. 3, 1957 |

FOREIGN PATENTS

| | | |
|---|---|---|
| 502,094 | Great Britain | of 1939 |
| 670,327 | Germany | of 1939 |